US012208404B2

(12) United States Patent
Petit

(10) Patent No.: US 12,208,404 B2
(45) Date of Patent: Jan. 28, 2025

(54) HIGH-PRESSURE PRE-COMPRESSION PUMP

(71) Applicant: APTAR FRANCE SAS, Le Neubourg (FR)

(72) Inventor: Ludovic Petit, Vitot (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 17/760,961

(22) PCT Filed: Sep. 16, 2020

(86) PCT No.: PCT/FR2020/051596
§ 371 (c)(1),
(2) Date: Mar. 16, 2022

(87) PCT Pub. No.: WO2021/053291
PCT Pub. Date: Mar. 25, 2021

(65) Prior Publication Data

US 2022/0379331 A1 Dec. 1, 2022

(30) Foreign Application Priority Data

Sep. 17, 2019 (FR) ....................................... 1910258

(51) Int. Cl.
*B05B 11/00* (2023.01)
*B05B 11/10* (2023.01)

(52) U.S. Cl.
CPC ........ *B05B 11/1039* (2023.01); *B05B 11/107* (2023.01); *B05B 11/1094* (2023.01); *B05B 11/1097* (2023.01)

(58) Field of Classification Search
CPC ............. B05B 11/1025; B05B 11/1039; B05B 11/1018; B05B 11/104; B05B 11/1061;
(Continued)

(56) References Cited

U.S. PATENT DOCUMENTS 3,761,022 A * 9/1973 Kondo ................ B05B 11/1039
239/350
3,774,849 A * 11/1973 Boris ..................... A45D 34/02
239/338
(Continued)

FOREIGN PATENT DOCUMENTS

DE 692 05 185 T2 3/1996
FR 2 165 571 A5 8/1973
(Continued)

OTHER PUBLICATIONS

International Search Report of PCT/FR2020/051596 dated Jan. 13, 2021 [PCT/ISA/210].
(Continued)

*Primary Examiner* — Charles P. Cheyney
(74) *Attorney, Agent, or Firm* — Sughrue Mion, PLLC

(57) ABSTRACT

Pump for dispensing a fluid product, having a piston having a pump chamber and an inlet and outlet valve. The outlet valve has an outlet valve element that slides inside the pump chamber. The pump chamber has a passage so that, at the end of actuation, the outlet valve element collaborates non-sealingly with the passage to open the outlet valve to expel product. The inlet valve has an inlet valve element sliding in a sleeve containing a spring pressing against the inlet valve element and against an end wall of the sleeve. The outlet valve element is formed by a component inserted with the ability to move into the piston, with the interposition of a second spring, the force exerted by the second spring is greater than the force exerted by the spring in the rest position, and less than the force exerted by the spring in the actuated position.

5 Claims, 1 Drawing Sheet

(58) Field of Classification Search
CPC ............... B05B 11/107; B05B 11/1094; B05B 11/1097; B05B 11/1001
USPC ........................ 222/321.2, 321.7, 321.9, 385
See application file for complete search history.

(56) References Cited

U.S. PATENT DOCUMENTS

| | | | | | | |
|---|---|---|---|---|---|---|
| 4,022,354 | A | * | 5/1977 | Kotuby | B05B 11/104 | 222/321.2 |
| 4,029,261 | A | * | 6/1977 | Olegnowicz | F04B 53/122 | 239/350 |
| 4,082,222 | A | * | 4/1978 | Boris | B05B 11/1097 | 222/321.3 |
| 4,147,476 | A | * | 4/1979 | Warren | B05B 11/1074 | 141/117 |
| 4,228,931 | A | * | 10/1980 | Ruscitti | B05B 11/1061 | 222/321.2 |
| 4,245,967 | A | * | 1/1981 | Busselet | B05B 11/1025 | 417/510 |
| 4,325,499 | A | * | 4/1982 | Shay | B05B 11/1039 | 222/321.2 |
| 4,325,500 | A | * | 4/1982 | Shay | B05B 11/1039 | 222/321.2 |
| 4,643,338 | A | * | 2/1987 | Iizuka | B05B 11/1088 | 239/333 |
| 4,693,675 | A | * | 9/1987 | Venus, Jr. | B05B 11/1039 | 417/489 |
| 4,726,747 | A | * | 2/1988 | Skorka | B05B 11/107 | 417/489 |
| 4,930,999 | A | * | 6/1990 | Brunet | B05B 11/1018 | 222/321.2 |
| 5,038,965 | A | * | 8/1991 | Cater | B05B 11/1025 | 222/321.2 |
| 5,147,073 | A | * | 9/1992 | Cater | B05B 11/1074 | 222/402.2 |
| 5,217,148 | A | * | 6/1993 | Cater | B05B 11/0037 | 222/321.2 |
| 5,482,188 | A | * | 1/1996 | Lina | B05B 11/1097 | 222/321.2 |
| 5,655,688 | A | * | 8/1997 | Moore | B05B 11/1004 | 222/321.2 |
| 6,145,710 | A | * | 11/2000 | Carter | B05B 11/109 | 222/321.9 |
| 7,281,644 | B2 | * | 10/2007 | Cater | B05B 11/1025 | 222/321.2 |
| 8,056,770 | B2 | * | 11/2011 | Lompech | B05B 11/1026 | 222/321.2 |
| 8,631,976 | B2 | * | 1/2014 | Moretti | B05B 11/1008 | 222/321.2 |

FOREIGN PATENT DOCUMENTS

| | | |
|---|---|---|
| FR | 2 260 391 A2 | 9/1975 |
| FR | 2 320 788 A2 | 3/1977 |

OTHER PUBLICATIONS

International Preliminary Report on Patentability issued Sep. 2, 2021 in International Application.

* cited by examiner

HIGH-PRESSURE PRE-COMPRESSION PUMP

CROSS REFERENCE TO RELATED APPLICATIONS

This application is a National Stage of International Application No. PCT/FR2020/051596 filed on Sep. 16, 2020, claiming priority based on French Patent Application No. 1910258 filed on Sep. 17, 2019.

The present invention relates to a pump for dispensing metered quantities of fluid. More specifically, the pump is a precompression pump, wherein the dispensing of the fluid product is carried out at a high pressure of at least 15 bars.

Documents WO2014/125216, WO0102100, WO8704373 and EP0265270 disclose pumps wherein the dispensing of the fluid product is independent from the speed and/or the actuation force of the user. During actuation of the pump, a spring is compressed under the effect of pressure created inside the pump chamber, said spring being released at the end of actuation after opening of an outlet valve, such that the dose of product contained in the pump chamber is expelled by said spring, independently from the actuation speed of the user. Typically, these pumps deliver a pressure of about 6-7 bars.

A drawback of pumps of this type is the possible presence of a residual drop of product which remains in the expulsion channel of the pump and/or in the vicinity thereof after each actuation. This volume of liquid, even if very small, is likely to alter a possible spray nozzle mounted on the pump, for example by partially clogging the hole or holes of said spray nozzle during the storage time between two actuations. This risk is increased when the spray nozzle comprises a plurality of micro-holes.

Documents DE69205185, FR2320788, FR2260391 and FR2165571 describe prior-art pumps. None of these pumps dispense the fluid at an elevated pressure of at least 15 bars.

An object of the present invention is to provide a pump that does not have the above-mentioned drawbacks.

In particular, an object of the present invention is to provide a pump in which there is no residual drop at the outlet of the pump after each actuation.

An object of the present invention is to provide a pump which delivers the fluid product at a greater pressure compared with traditional pumps.

Another object of the present invention is to provide such a pump that is simple and easy to manufacture and to assemble, and that is reliable in its use.

Another object of the present invention is to provide such a pump that guarantees complete and reproducible dispensing of the contents of the pump chamber on each actuation, regardless of the actuation speed imparted by the user.

The present invention thus provides a pump for dispensing a fluid product comprising a piston secured to an actuating stem and which slides in a pump body having a pump chamber defined between an inlet valve and an outlet valve, said outlet valve comprising an outlet valve element sliding during actuation in a sealed manner in the pump chamber, said pump chamber comprising passage means such that, at the end of actuation of the pump, said outlet valve element co-operates in a non-sealed manner with said passage means in order to open said outlet valve to allow the expulsion of the product contained in the pump chamber, said inlet valve comprising an inlet valve element which slides after closure of the inlet valve in a sleeve of the pump body, said sleeve having a reduced diameter and containing a spring bearing firstly on said inlet valve element and secondly on a bottom of said sleeve, said spring, in addition expelling the product, also returning the piston into its rest position, said outlet valve element being formed by a separate part which is inserted movably in said piston, with the interposition of a second spring, the force exerted by said second spring being greater than the force exerted by said spring in position at rest, and less than the force exerted by said spring in the actuated position.

Advantageously, a sleeve is inserted into said pump body to reinforce the side wall of said pump chamber.

Advantageously, said sleeve includes a shoulder defining said passage means of said outlet valve.

Advantageously, when the piston has returned to its rest position after actuation, said second spring expands and displaces said outlet valve element axially downwards relative to said piston, generating a vacuum which draws the residual liquid which remains in and/or close to said actuating stem after each actuation.

Advantageously, said sleeve of the pump body in which said inlet valve element slides comprises external reinforcing ridges.

Advantageously, said fluid is dispensed at a pressure of at least 15 bars.

The present invention also relates to a device for dispensing a fluid product including a pump as described above.

These characteristics and advantages and others of the present invention appear more clearly from the following detailed description, given by way of non-limiting example, and with reference to the accompanying drawings, and in which.

Figure 1:
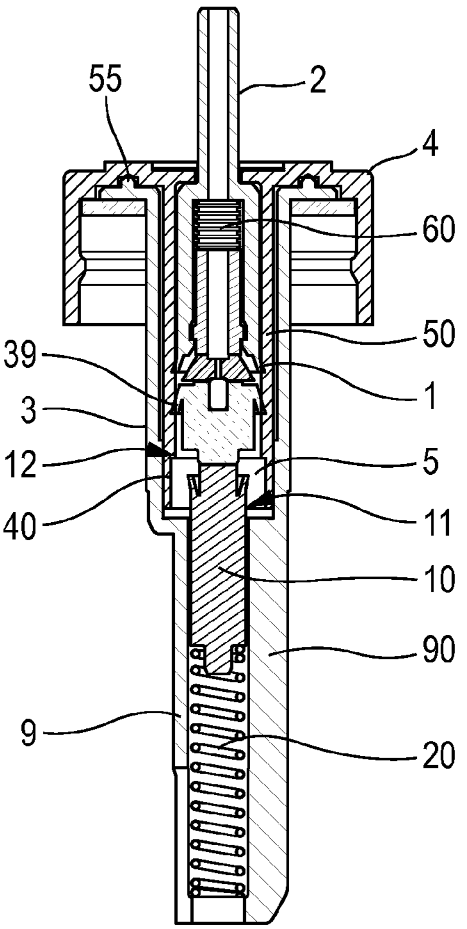
FIG. 1 is a diagrammatic section view of a pump in an advantageous embodiment, in the rest position.

In the description below, the terms "upwards", and "downwards" are relative to the upright position of the the pump shown in the figures. The terms "axial", "lateral" and "radial" refer to the longitudinal central axis of the pump.

The pump according to the invention comprises a pump body 3 in which there slides a piston 1 that is secured to an actuating stem 2 on which the user presses so as to actuate the pump. The piston 1 slides in a pump chamber 5 defined in the pump body 3 between an inlet valve 11 and an outlet valve 12. A fixing ring 4, for example which can be crimped, screwed or snap-fitted, allows to fix the pump to a tank.

The inlet valve 11, open in the rest position of the pump, as can be seen in FIG. 1, is formed by an inlet valve element 10 which can be moved in the pump body 3 during actuation of the pump. Said inlet valve element 10 co-operates in a sealed manner from the beginning of the actuation of the pump with a sleeve 9 of the pump body 3 in order to close the inlet valve 11. A spring 20 is pressed on the one hand on the inlet valve element 10 and on the other hand, on the bottom of said sleeve 9.

The outlet valve 12 comprises an outlet valve element 39 and it is made so that, during actuation of the pump, it opens only at the end of actuation of the pump, so as to enable the fluid contained in the pump chamber to be expelled. This opening is made, at passage means 40 formed at a radial inner shoulder 40 of the pump chamber 5. The aim of said passage means 40 is to close at least one fluid passage when the outlet valve element 39, which during the whole actuation stroke of the pump co-operates in a sealed manner with the pump chamber 5, comes to the end of the actuation stroke at said passage means 40.

The expulsion of the product contained in the pump chamber 5 is thus carried out independently from the actuation speed exerted by the user. To do this, the inlet valve element 10 co-operates with the spring 20 which, during actuation of the pump, is compressed by the movement of the inlet valve element 10 under the effect of pressure created in the pump chamber. At the end of the actuation stroke of the pump, when the outlet valve 12 is open, said compressed spring 20 is suddenly released, such that the product contained in the pump chamber is expelled by means of said spring. Advantageously, said spring 20 of the inlet valve 11 also acts as a return spring of the pump, thus returning the piston 1 into its rest position after the product has been expelled.

The side wall of the pump chamber 5 is reinforced by the insertion of a sleeve 50 into the pump body 3. This sleeve 50 can be secured, for example of one part, to the fixing ring 4. This sleeve 50 thus forms a double wall in the pump chamber 5, which allows to avoid a deformation of the inner side wall of the pump chamber 5 due to the high pressure created by the pump during actuation. This sleeve 50 advantageously includes the radial shoulder forming passage means 40 that defines the outlet valve. Advantageously, to avoid any leakages between the sleeve 50 and the pump body 3, a sealed weld 55 is provided, for example by ultrasound, preferably between two radial flanges respectively of said pump body 3 and of said fixing ring 4 which incorporates the sleeve 50.

Likewise, the sleeve 9, which co-operates with the inlet valve element 10, axially extends the pump body 3 downwards in the orientation of Figures and contains said inlet valve element 10 and said spring 20. The sleeve 9 has a reduced diameter with respect to the pump body 3. It advantageously comprises external reinforcement ridges 90. This implementation of the sleeve 9 makes it possible to reduce its radial dimensions. Thus, for example, the sleeve 9 of the pump could have a diameter less than 4.2 mm, advantageously less than 4 mm, preferably 3.9 mm.

The pump therefore substantially improves the sealing capacities of the different sealed parts, namely the piston 1, the outlet valve element 39 and the inlet valve element 10.

Thus, it becomes possible to use a spring having a greater force, typically at least 20 N, advantageously 25 N.

With an inner diameter of the sleeve 9 of 3.9 mm, that is a surface area of 12 $mm^2$, and a spring of 20 N, a pressure P of about 16.5 bars is reached. With a spring of 25 N, the pressure increases to about 21 bars.

Thus, the present invention allows to provide a precompression pump capable of dispensing the fluid product at a pressure of at least 15 bars, advantageously about 20 bars, which is greater than traditional pumps and even greater than valves operating with a propellant gas.

The actuation force of such a pump with a spring at 25 N and the surface area S of 12 $mm^2$ is less than 60 N, advantageously of about 50 N, which remains acceptable.

Such a pump is in particular adapted to be associated with a spray nozzle comprising a plurality of micro-holes, in particular with a hole diameter of less than 5 μm, or even less than 2 μm.

In the invention, the outlet valve element 39 is formed by a separate part that is inserted in a movable manner in the piston 1, with a second spring 60 interposed therebetween.

This second spring 60 exerts, in the rest position shown in FIG. 1, a force greater than that of the spring 20, so that in this rest position, the second spring 60 bias the outlet valve element 39 axially downwards, away from said piston 1.

Figure 2:
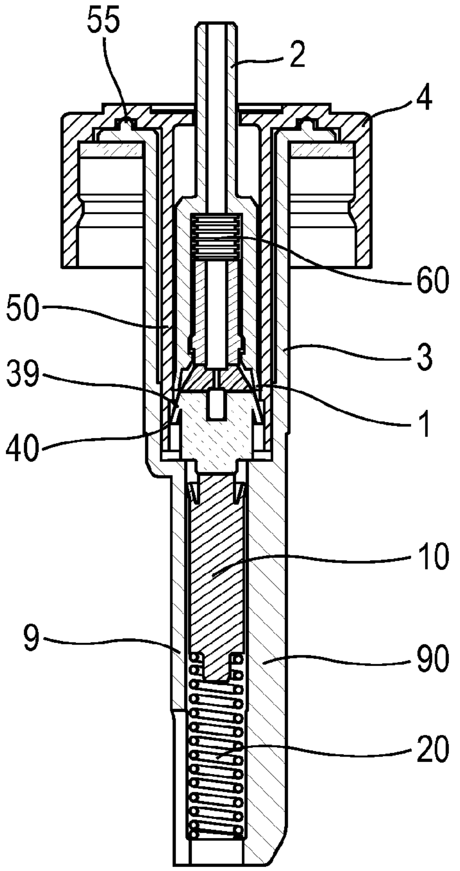
FIG. 2 is a view similar to the view in FIG. 1 in the actuated position.
Figure 3:
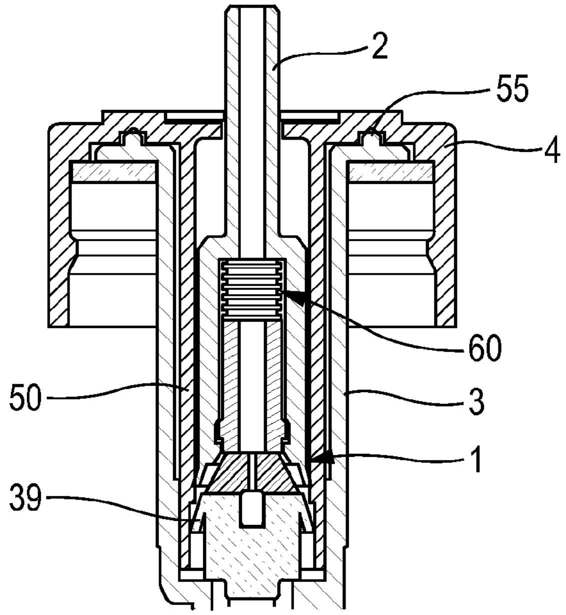
FIG. 3 is a larger-scale detail view of a portion of FIG. 2.

During actuation, the spring 20 is compressed, such that in the actuated position, shown in FIGS. 2 and 3, the second spring 60 is compressed and the outlet valve element 39 has been inserted axially further into the piston 1.

After actuation, when the piston 1 has returned to its rest position, the second spring 60 can again expand, which displaces the outlet valve element 39 axially downwards relative to said piston 1, generating a vacuum which draws the residual liquid which remains in and/or close to the actuating stem 2 after each actuation.

The present invention therefore makes it possible to re-draw this small quantity of residual fluid after each actuation, thus preventing any risk of partial or total clogging of a spray nozzle disposed downstream of the actuator rod 2.

The operation of the pump will be explained below.

The rest position can be seen in FIG. 1, with the inlet valve 11 open and the outlet valve 12 closed.

The second spring 60 is expanded, given that its force is greater in this rest position than that of the spring 20.

In this rest position, the outlet valve element 39 is pushed axially downwards by the second spring 60 in order to come into contact with the inlet valve element 10 which presses on the spring 20.

At the beginning of actuation, the actuating stem 2 is pushed downwards, which moves the piston 1, the second spring 60, the outlet valve element 39 and the inlet valve element 10 also downwards relative to the pump body 3. The inlet valve 11 is closed, by sealed co-operation between the lips of the inlet valve element 10 and the inner cylindrical surface of the sleeve 9, while the outlet valve 12 remains closed. The spring 20 is then compressed under the effect of the inlet valve element 10 which slides in the sleeve 9. The sleeve 9 having a reduced diameter with respect to the sleeve 50 arranged in the pump body 3, and the fluid contained in the pump chamber 5 being incompressible, this compression of the spring 20 occurs relatively easily, despite the increased force of said spring 20.

When the force of the compressed spring 20 becomes greater than that of the second spring 60, the latter will compress and allow the outlet valve element 39 to move slightly axially upwards with respect to the piston 1.

When the end of actuation approaches, the outlet valve element 39 approaches the shoulder 40 of the outlet valve, to open it.

FIG. 2 shows the actuated position, with the outlet valve open and therefore the content of the pump chamber 5 which is expelled under the effect of the spring 20 which expands. The fluid product is thus expelled with a pressure of at least 15 bars, advantageously of at least 20 bars.

When the user relieves the pressure on the actuating stem 2 of the pump, the spring 20 returns the piston 1 into its rest position.

When the force of the compressed spring 20 becomes again less than that of the second spring 60, the latter will decompress and allow the outlet valve element 39 to move slightly axially downwards with respect to the piston 1. This will generate a vacuum in the actuating stem 2 and draw the small volume of residual liquid or fluid that remains in and/or close to said actuating stem after each actuation.

Naturally, the invention is not limited to the embodiments shown in the drawings, and the ambit of the invention is, on the contrary, defined by the accompanying claims.

The invention claimed is:

1. A pump for dispensing a fluid product comprising a piston secured to an actuating stem and which slides in a pump body having a pump chamber defined between an inlet valve and an outlet valve, said outlet valve comprising an outlet valve element sliding during actuation in a sealed manner along the pump chamber, said pump chamber comprising passage means such that, at the end of actuation of the pump, said outlet valve element co-operates in a non-sealed manner with said passage means in order to open said outlet valve to allow the expulsion of the product contained in the pump chamber, said inlet valve comprising an inlet valve element which slides after closure of the inlet valve in a sleeve of the pump body, said sleeve having a reduced diameter and containing a spring pressing firstly on said inlet valve element and secondly on a bottom of said sleeve, said spring, in addition expelling the product, also returning the piston into its rest position, wherein said outlet valve element is formed by a separate part which is inserted movably in said piston, with the interposition of a second spring, the force exerted by said second spring being greater than the force exerted by said spring in position at rest, and less than the force exerted by said spring in the actuated position;

wherein the pump chamber includes a pump chamber shoulder disposed above the sleeve, said pump chamber shoulder having a reduced diameter from the pump chamber;

wherein a reinforcement sleeve is inserted into said pump body and placed into contact with the pump chamber shoulder to reinforce the side wall of said pump chamber, forming a double wall in the pump chamber to avoid a deformation of said side wall due to high pressure created during actuation; and wherein said reinforcement sleeve includes a shoulder defining said passage means of said outlet valve.

2. The pump according to claim 1, wherein, when the piston is returned to its rest position after actuation, said second spring expands and moves said outlet valve element axially downwards relative to said piston, generating a vacuum that draws the residual liquid that remains in and/or near said actuating stem after each actuation.

3. The pump according to claim 1, wherein said sleeve of the pump body in which said inlet valve element slides includes external reinforcing ridges.

4. The pump according to claim 1, wherein said fluid is dispensed at a pressure of at least 15 bar.

5. A product fluid product dispensing device, comprising a pump according to claim 1.

* * * * *